(12) United States Patent
Ogawa et al.

(10) Patent No.: US 6,899,147 B2
(45) Date of Patent: May 31, 2005

(54) FILLING DEVICE AND METHOD

(75) Inventors: Taro Ogawa, Kurashiki (JP);
Yasumasa Senoo, Kurashiki (JP);
Yasuyuki Toda, Kurashiki (JP); Mitsuo
Katayama, Okayama (JP)

(73) Assignee: Namba Press Works Co., Ltd.,
Okayama (JP)

( * ) Notice: Subject to any disclaimer, the term of this patent is extended or adjusted under 35 U.S.C. 154(b) by 227 days.

(21) Appl. No.: 10/221,591

(22) PCT Filed: Jun. 6, 2001

(86) PCT No.: PCT/JP01/04786
§ 371 (c)(1),
(2), (4) Date: Sep. 12, 2002

(87) PCT Pub. No.: WO02/060809
PCT Pub. Date: Aug. 8, 2002

(65) Prior Publication Data
US 2004/0250870 A1 Dec. 16, 2004

(30) Foreign Application Priority Data
Jan. 31, 2001 (JP) .......................................... 2001-22645

(51) Int. Cl.$^7$ ................................................ B65B 1/04
(52) U.S. Cl. .............................. 141/59; 141/69; 141/71; 141/80; 141/313; 141/114; 53/432; 53/510
(58) Field of Search ........................ 141/12, 59, 69–80, 141/114, 313–317; 53/432, 433, 510, 511

(56) References Cited
U.S. PATENT DOCUMENTS

| | | | | |
|---|---|---|---|---|
| 3,260,285 A | * | 7/1966 | Vogt ................................ | 141/8 |
| 3,351,106 A | * | 11/1967 | Moulthrop ..................... | 141/67 |
| 5,173,307 A | | 12/1992 | Nestle .......................... | 425/4 R |
| 5,518,048 A | * | 5/1996 | Derby ........................... | 141/80 |
| 5,555,705 A | * | 9/1996 | Balcombe ..................... | 53/432 |

FOREIGN PATENT DOCUMENTS

| | | | | |
|---|---|---|---|---|
| DE | 1 057 753 | 5/1959 | | |
| DE | 3821410 C1 | 2/1990 | ........... | B29C/67/20 |
| JP | 56-18233 | 4/1981 | | |
| JP | 04231018 | 12/1992 | ............. | A47L/9/04 |
| JP | 7-313755 | 12/1995 | | |
| JP | 08072083 | 7/1996 | ........... | B29C/43/36 |
| JP | 11-314239 | 11/1999 | | |
| JP | 200246743 | 1/2001 | ........... | B29C/39/10 |

* cited by examiner

Primary Examiner—Steven O. Douglas
(74) Attorney, Agent, or Firm—Renner, Kenner, Greive, Bobak, Taylor & Weber

(57) ABSTRACT

A filler material packing system for packing a granular or fragmental filler material in a bag-shaped hollow surface material includes a suction-type packing container, and means for delivering the filler material. The packing container has an inner space. At least a part of the surface material is air-permeable, and the surface material is positioned in the inner space. The packing container has a suction port and an entry port that are connected to the inner space. The filler material is delivered to the inside of the surface material positioned in the inner space of the packing container by the filler material delivering means. The filler material delivering means includes a cylindrical stirring container having a lid, a sidewall and a bottom wall. The stirring container has a stirring vane positioned on the bottom wall. Air vent holes and an outlet port are provided in an upper part of the sidewall. The filler material delivering means further includes means for connecting between the outlet port of the stirring container and the entry port of the packing container and then connecting between the inside of the surface material positioned in the inner space of the packing container and the entry port thereof. The filler material delivering means further includes a pumping source connected to the inner space of the packing container through a suction port of the packing container.

7 Claims, 11 Drawing Sheets

(a)

(b)

FILLING DEVICE AND METHOD

TECHNICAL FIELD

The present invention relates to a system and method for packing a granular or fragmental filler material in a bag-shaped hollow surface material and, in particular, relates to such a system and method capable of smoothly packing the filler material in the surface material.

BACKGROUND OF THE ART

A cushion may be used for a headrest and an armrest of a seat used for an automobile. Such a cushion is composed of a bag-shaped hollow surface material and an inner body covered with the surface material. The inner body is molded in a predetermined shape by passing steam through urethane chips mixed with a water reactive urethane binder and is then covered with the surface material. As a problem of the art, it is not easy to cover the inner body with the surface material so that it takes much time for such a covering work, and as another problem, a wrinkle is produced on the surface material and a seam line of the surface material is curved so that it makes its quality worse.

Such problems can be solved by a prior art disclosed in Japanese Patent Application No. Heisei 11(1999)-289480 filed by the same assignee as that of the present patent application. This prior art provides a filler material packing system and method for packing a granular or fragmental filler material in a bag-shaped hollow surface material. In this prior art, granules or fragments of scrapped urethane foam and the scrapped surface material to be wasted may be used as the filler material. In this prior system and method, an article 1 shown in FIG. 1A is formed packing an air-permeable bag-shaped hollow surface material 1a with a mixture of the filler material and a water reactive binder. Then, as shown in FIG. 1(a), this article 1 is positioned in a molding device 2 having a predetermined cavity. The molding device 2 has an upper and a lower molds 2a, 2b, and the article 1 is then clamped between those molds 2a, 2b. Then, as shown in FIG. 1(b), steam is introduced in the molding device 2 and passes through the inside thereof. The binder reacts with the steam so that the filler material is adhered each other and is adhered with the inner surface of the surface material. Thereby, a product 1' having a predetermined shape is molded in one with the surface material without producing wrinkle on the surface material and curving the seam line of the surface material.

Such an article 1 is molded by use of a suction-type packing container shown in FIG. 2. The suction-type packing container 3 is composed of a lower part 3b and an upper part 3a that can seal the inside of the suction-type packing container 3, and as shown in FIG. 2, a bag-shaped hollow surface material 1a having an opening 1b is positioned inside the suction-type packing container 3. The lower part 3b has a suction port 4 connected to a suction pump and an entry port 5 for delivering a filler material T through this entry port 5. In order to make easy to deliver the filler material T to the inside of the surface material 1a, a funnel 6 is positioned such that the funnel 6 passes through the entry port 5 and comes into the inside of the surface material 1a through the opening 1b thereof. In this arrangement when the suction pump is driven, air inside the suction-type packing container 3 is evacuated and the inside of the suction-type packing container 3 is decompressed so that air is entered in the inside of the suction-type packing container 3 through the entry port 5 and the opening 1b via the funnel 6. When the filler material T is approached to the funnel 6, the filler material T is delivered by the airflow to the inside of the surface material 1a, and thereby the surface material 1a is packed with the filler material T.

As described above, it has been possible to easily pack a bag-shaped hollow surface material with a predetermined amount of a filler material.

According to this packing method, granular or fragmental waste of a scrapped surface material and a scrapped urethane foam can be recycled to manufacture a seat and an accessory used for an automobile.

It is desirable that a filler material should be stably delivered through the entry port of the suction-type packing container by use of airflow when a bag-shaped hollow surface material is packed with the filler material as described above. In order to achieve that the filler material is stably delivered through the entry port, it is necessary that the filler material should be mixed evenly with the airflow. If the filler material is concentrated locally in the airflow or if there is a mass of the filler material in the airflow, the entry port may be blocked so that the filler material cannot be delivered through the entry port.

In addition to this matter, if the density of the filler material in the airflow is changed, the filler material may be unevenly packed in the surface material so that the filler material is not stably adhered each other and with the inner surface of the surface material even though the filler material is premixed with a binder.

The present invention is made to solve those problems, and thus, an object of the present invention is to provide a filler material packing system and method capable of delivering a scattered filler material to the entry port.

Another object of the present invention is to provide such a filler material packing system and method in which the filler material is delivered in a uniform density to the inside of a bag-shaped hollow surface material.

The other object of the present invention is to provide such a filler material packing system and method in which the filler material is stably delivered to the inside of the surface material.

DISCLOSURE OF THE INVENTION

A filler material packing system according to the present invention for packing a granular or fragmental filler material in a bag-shaped hollow surface material includes a suction-type packing container, and means for delivering the filler material. The suction-type packing container has an inner space. At least a part of the surface material is air-permeable, and the surface material is positioned in the inner space. The suction-type packing container has a suction port and an entry port that are connected to the inner space. The filler material is delivered to the inside of the surface material positioned in the inner space of the suction-type packing container by the filler material delivering means.

The filler material delivering means includes a cylindrical stirring container having a lid, a sidewall and a bottom wall. The stirring container has a stirring vane positioned on the bottom wall. Air vent holes and an outlet port are provided in an upper part of the sidewall. The filler material delivering means further includes means for connecting between the outlet port of the stirring container and the entry port of the suction-type packing container and then connecting between the inside of the surface material positioned in the inner space of the suction-type packing container and the entry port thereof. The filler material delivering means further includes a pumping source connected to the inner space of the suction-type packing container through a suction port of the suction-type packing container. If the pumping source is driven, the inside of the suction-type packing container is evacuated and decompressed so that air flows in the inside of the surface material positioned in the inner space of the suction-type packing container through the air vent holes of the stirring container, the outlet port thereof and the filler material delivering means, and the air flows in the inner space of the suction-type packing container through the surface material and then flows to the pumping source through the suction port.

The lid of the stirring container is opened, and then the filler material is supplied in the stirring container. The filler material supplied therein is stirred by rotating the stirring vane positioned on the bottom wall of the stirring container. Preferably, the stirring vane is rotated by use of an electric motor. If the filler material is mixed with a water reactive binder, the water reactive binder is supplied in the stirring container while the filler material is stirred by rotating the stirring vane. The water reactive binder is supplied therein at the same time as the stirring or during the stirring. Preferably, the water reactive binder is supplied in the stirring container through a nozzle provided in an upper part of the sidewall of the stirring container or the lid thereof.

When the filler material is stirred in the stirring container as described above, a mass of the filler material that is relatively heavy weight falls downward by the gravity. The relatively heavy weight filler material is then broken into small pieces by the rotating stirring vane. Meanwhile, the relatively lightweight filler material that has been broken in small pieces flies upward so as to change place with a mass of the filler material As a result, a whole of the filler material is going to be broken into small pieces. If the water reactive binder is used, the water reactive binder is supplied during stirring the filler material as described above. The water reactive binder supplied attaches to each of small pieces of the filler material flied upward to an upper part of the stirring container as described above. The filler material with the water reactive binder falls downward by the gravity. The filler material that has been broken into small pieces flies upward so as to change place with the filler material with the water reactive binder. Then, the water reactive binder attaches to the filler material broken into small pieces. Thus, the water reactive binder is evenly mixed with the filler material.

The surface material is positioned in the inner space of the suction-type packing container, and then, the pumping source is driven while the filler material is stirred in the stirring container. Thereby, the filler material is packed in the inside of the surface material. When the pumping source is driven, the inside of the suction-type packing container is decompressed. Air flows from the air vent holes of the stirring container to the outlet port at a low pressure provided in the upper part of the stirring container. When this, the filler material stirred flies up toward the outlet port at the low pressure and flows together with airflow that flows to the outlet of the stirring container, so that the filler material is delivered to the inside of the surface material positioned in the inner space of the suction-type packing container, through connecting means. The filler material delivered to the inside of the surface material together with the airflow is packed in the inside of the surface material. Meanwhile, the air passes through the surface material and then flows to the pumping source through the suction port of the suction-type packing container. While a mass of the filler material that is relatively heavy weight flies upward with the relatively lightweight filler material, such a mass falls downward by the gravity, and thus, only the relatively lightweight filler material that has been broken into small pieces is delivered in the inside of the surface material with the airflow. The mass of the filler material that once flies upward in the stirring container falls downward and is then broken into small pieces. The small pieces fly upward and is then delivered to the inside of the surface material.

Preferably, the connecting means for connecting between the outlet port of the stirring container and the inner space of the suction-type packing container includes a funnel. The funnel is inserted from the entry port of the suction-type packing container to the inner space thereof. The connecting means also includes a pipe. One end of the pipe is connected to the outlet port of the stirring container and another end of the pipe is connected to the entry port of the suction-type packing container. The surface material has an opening that connects to the inside thereof. A tip part of the funnel is inserted in the inside of the surface material positioned in the inner space of the suction-type packing container.

Preferably, the suction-type packing container is composed of an upper part and a lower part, and those parts are pivotally connected each other. A molding device is placed in the inner space of the suction-type packing container. The molding device has an upper mold and a lower mold, and a cavity that can position the surface material is formed by those molds. Those molds have suction holes that connect between the inside and the outside of the cavity. The molding device has an inlet coaxial with the entry port of the suction-type packing container.

It is desirable that the upper mold of the molding device is fixed to the upper part of the suction-type packing container and the lower mold of the molding device is fixed to the lower part of the suction-type packing container. Thereby, when the upper part of the suction-type packing container is opened with respect to its lower part, the upper mold of the molding device is simultaneously opened with respect to the lower mold of the molding device. The opening of the surface material is desirably connected with the entry port of the suction-type packing container using a funnel.

In accordance with the present invention, the filler material is packed in the surface material using the filler material packing system described above. The surface material is positioned in the inner space of the suction-type packing container. A necessary amount of the filler material is brought in the stirring container. The stirring vane positioned on the bottom wall of the stirring container is rotated. While the outlet of the stirring container is connected to the entry port of the suction-type packing container through the connecting means, the inner space of the suction-type packing container is decompressed. By decompressing the inner space of the suction-type packing container, air flows from the air-vent holes of the stirring container to the outlet port at a lower pressure of the upper part of the stirring container. When this, the filler material stirred flows up and flows together with airflow formed toward the outlet port at the lower pressure of the stirring container. Then, the filler material is delivered to the inside of the surface material positioned in the inner space of the suction-type packing container through the connecting means. The filler material delivered together with the airflow to the inside of the surface material is packed in the inside of the surface material, and air passes through the surface material and flows to the pumping source through the suction port of the suction-type packing container.

BEST MODE FOR CARRYING OUT THE INVENTION

Figure 3:
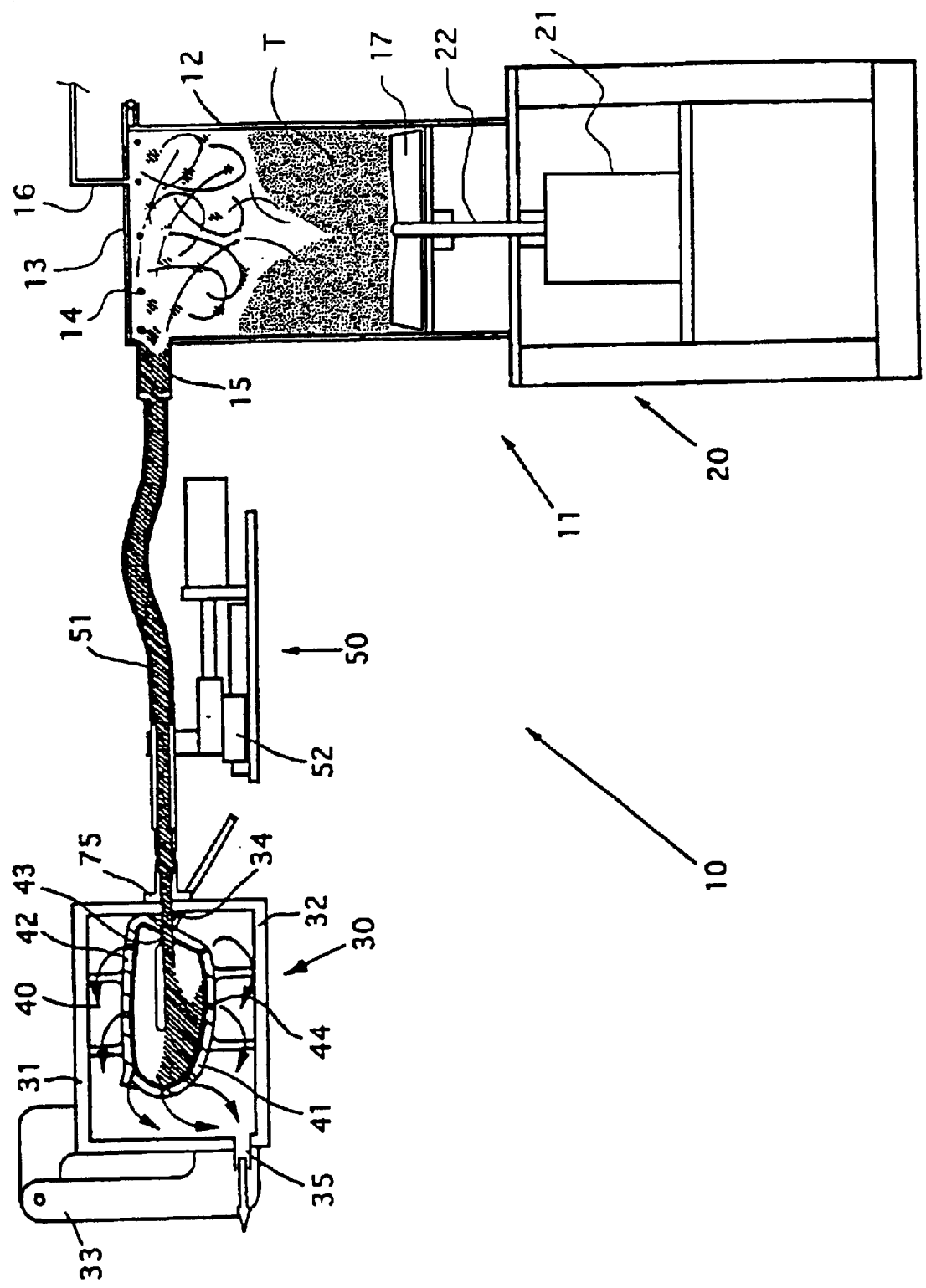
FIG. 3 shows a filler material packing system according to the present invention.

FIG. 3 shows a filler material packing system 10 according to the present invention. The filler material packing system 10 is composed of a stirring container 11, a suction-type packing container 30, and a connector 50 for connecting between the stirring container 11 and the suction-type packing container 30. A bag-shaped hollow surface material is positioned in an inner space of the suction-type packing container 30. At least a part of this surface material is air-permeable.

Figure 4:
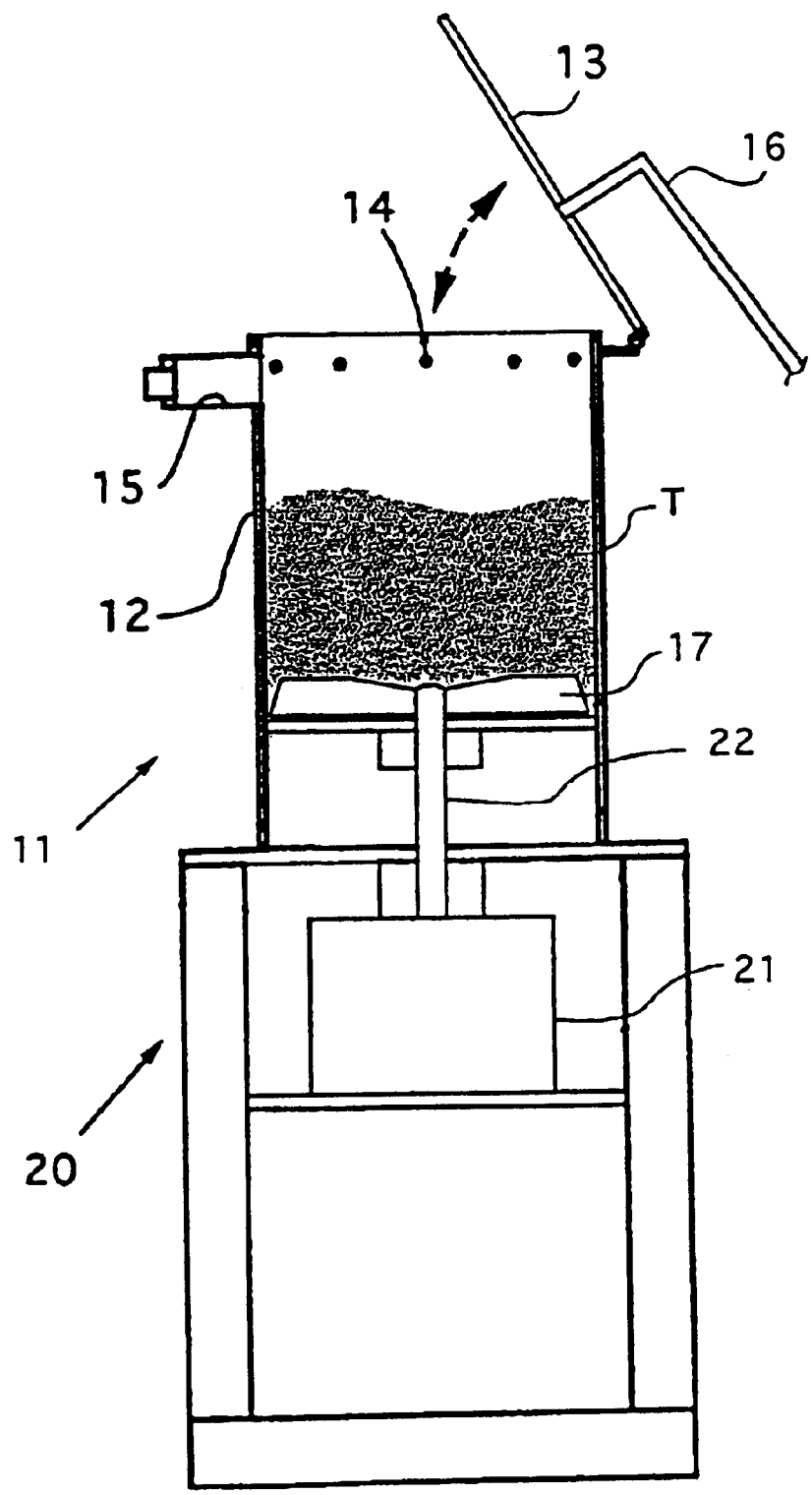
FIG. 4 shows a partial sectional view of a stirring container of a filler material packing system according to the present invention.

A granular or fragmental filler material is brought in the stirring container 11. The filler material T is appropriately delivered from the stirring container 11 to an inside of the surface material positioned in the suction-type packing container 30 through the connector 50. As shown in FIG. 4, a lid 13 is provided with a hinge on a top end of a cylindrical sidewall 12. The stirring container 11 has a plurality of air vent holes 14 provided around an upper part of the sidewall 12. Those air vent holes 14 are provided for drawing air into a space formed inside the cylindrical sidewall 12 as described below. Such air vent holes may be provided not only around the cylindrical sidewall 14 but also on the lid 13. The stirring container 11 has an outlet port 15 for delivering the filler material from the stirring container to the suction-type packing container. Also, the stirring container 11 has a stirring vane 17 provided in a bottom part of the stirring container 11. The stirring vane 17 stirs the filler material T brought in the stirring container 11.

Figure 5:
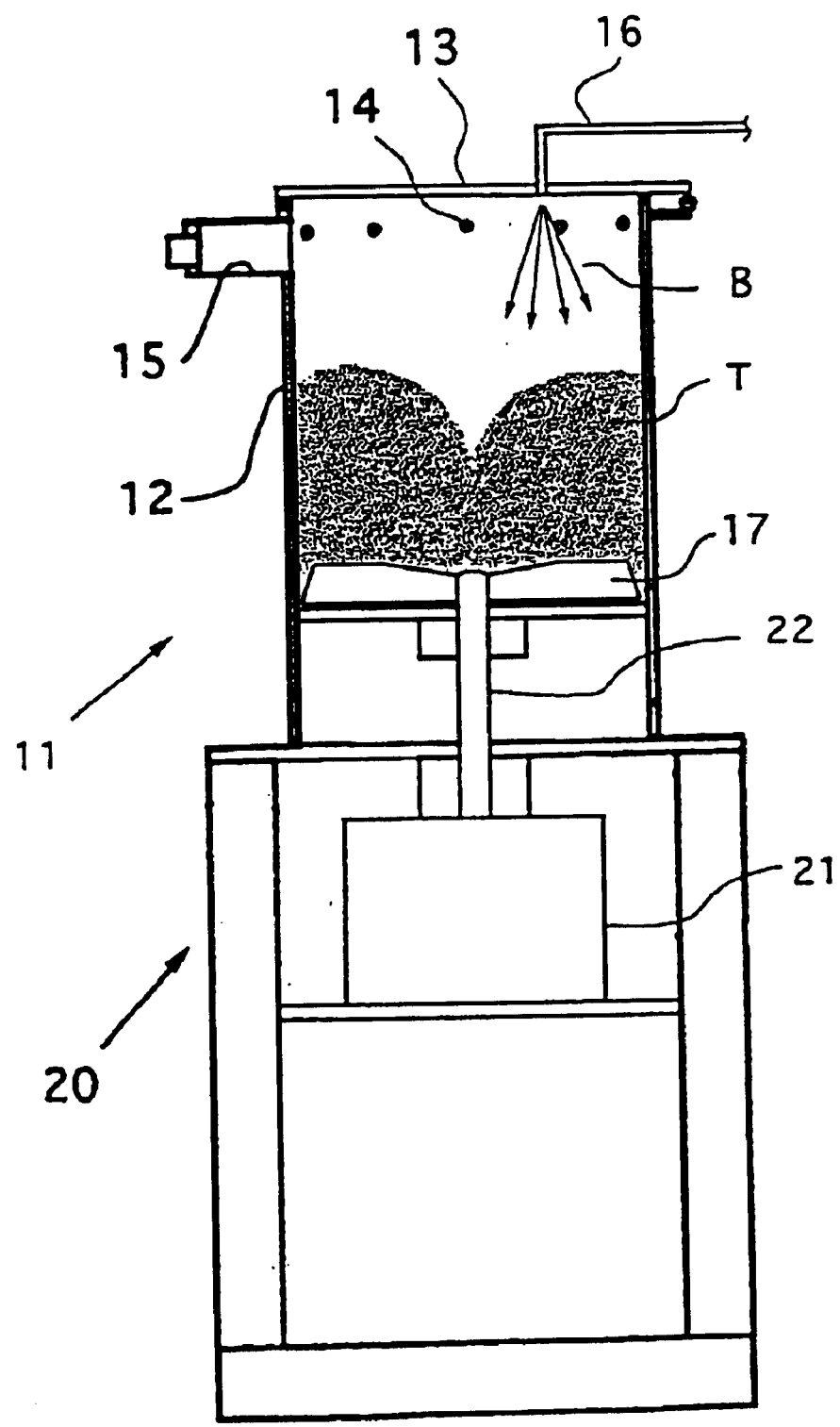
FIG. 5 is a partial sectional view of a stirring container of a filler material packing system according to the present invention and shows that a binder is supplied in the stirring container while a filler material therein is stirred.

A driving system 20 for rotating the stirring vane 17 is provided below the stirring container 11. The driving system 20 has an electric motor 21 connected to the stirring vane 17 via a shaft 22 such that the electric motor 21 can rotate the stirring vane 17. If the filler material T is mixed with a water reactive binder, the water reactive binder B is supplied in the stirring container 11 while the filler material T brought in the stirring container 11 is stirred therein, as shown in FIG. 5. The water reactive binder B is supplied therein at the same time as the stirring or during the stirring. Preferably, the water reactive binder B is supplied in the stirring container 11 by use of means of nozzle 16 provided in the upper part of the side wall 12 or on the lid 13 of the stirring container 11.

Figure 6:
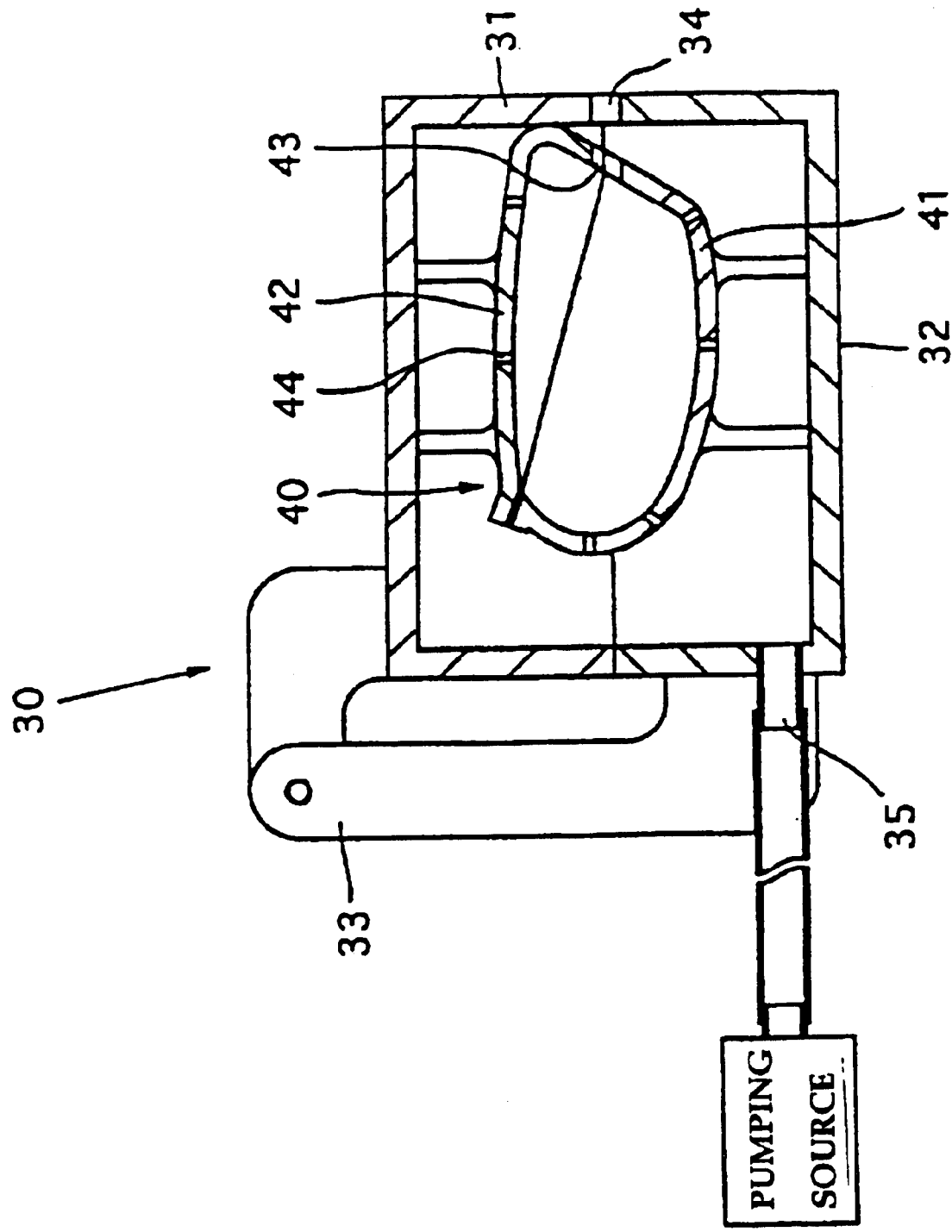
FIG. 6 is a partial sectional view of a suction-type packing container of a filler material packing system according to the present invention.

The suction-type packing container 30 is shown in FIGS. 5 and 6. The suction-type packing container 30 is composed of an upper part 31 and a lower part 32, and the upper part 31 is connected with the lower part 32 by use of a connector 33 so as to freely open and close those parts. When those parts are closed, a cavity is formed therein. In order to seal the cavity formed in the suction-type packing container 30, a seal material 31' (FIG. 6) is provided on a connection between those parts 31, 32. An entry port 34 for delivering a filler material to the inside thereof is also provided in a part of the connection. In addition, a suction port 35 is provided in the lower part 32, and its location is opposite to the entry port 34. The suction port 35 is connected to a pumping source.

The connector 50 connects between the entry port 34 of the suction-type packing container 30 and the outlet port 15 of the stirring container 11. The connector 50 has a flexible pipe 51, and an end of the flexible pipe 51 can be attached to the entry port 34 by use of a pipe-guiding device 52.

Thus, when the upper and lower parts 31, 32 are closed and the pumping source is then driven, air inside the suction-type packing container 30 is evacuated and air inside the stirring container 11 is also evacuated through the connector 50 connected between the entry port 34 of the suction-type packing container 30 and the outlet port 15 of the stirring container 10. When this, air is drawn into the stirring container 11 through the air vent holes 14, so that airflow is formed by driving the pumping source from the air vent holes 14 to the suction port 35 through the inside of the stirring container 11, the connector 50, the entry port 34 and the inside of the suction-type packing container 30.

In the operation, an air-permeable bag-shaped hollow surface material (shown below as an example) is positioned in the suction-type packing container 30 so as to match an opening of the surface material to the entry port 34, and a necessary filler material is brought into the stirring container. Then, the pumping source is driven. The filler material is delivered to the inside of the surface material together with the airflow described above, and as a result an article composed of the surface material and the filler material packed therein is formed. If it is necessary to mold the article, a molding device 40 is arranged inside the suction-type packing container 30.

As shown in FIG. 6, the molding device 40 arranged in the suction-type packing container 30 is composed of an upper mold 42 and a lower mold 41. If those upper and lower molds 42, 41 are closed, a cavity is formed. The cavity is generally corresponding to a shape of an article to be formed by packing the filler material in the surface material. An inlet port 43 coaxial with the entry port 34 is provided in a connection between those upper and lower molds 42, 41. Those upper and lower molds 42, 41 have a plurality of suction holes 44 connected between the inside and the outside of the molding device 40.

The lower mold 42 is fixed to the lower part 32 of the suction-type packing container 30, and the upper mold 42 is fixed to the upper part 31 of the suction-type packing container 30. Thus, as shown in FIG. 6, when the upper part 31 is pivotally moved with respect to the connector 33, the upper mold 42 is moved together with the upper part 31 with respect to the lower mold 41.

Steps of packing a surface material with a filler material by use of this filler material packing system 10 are described below. A material used as the filler material includes chips of urethane foam, fabric, soft slab urethane foam produced in manufacturing steps in a seat and a headrest of an automobile. In addition, a material used as the filler material includes not only the above materials but also shredder dusts of a used automobile and light-weight materials such as feather and powder difficult to handle and bring into the surface material.

EXAMPLE

As an example of an article manufactured by packing a filler material in a surface material, a headrest used for an automobile is considered and is manufactured using the filler material packing system 10 according to the present invention.

Figure 7:
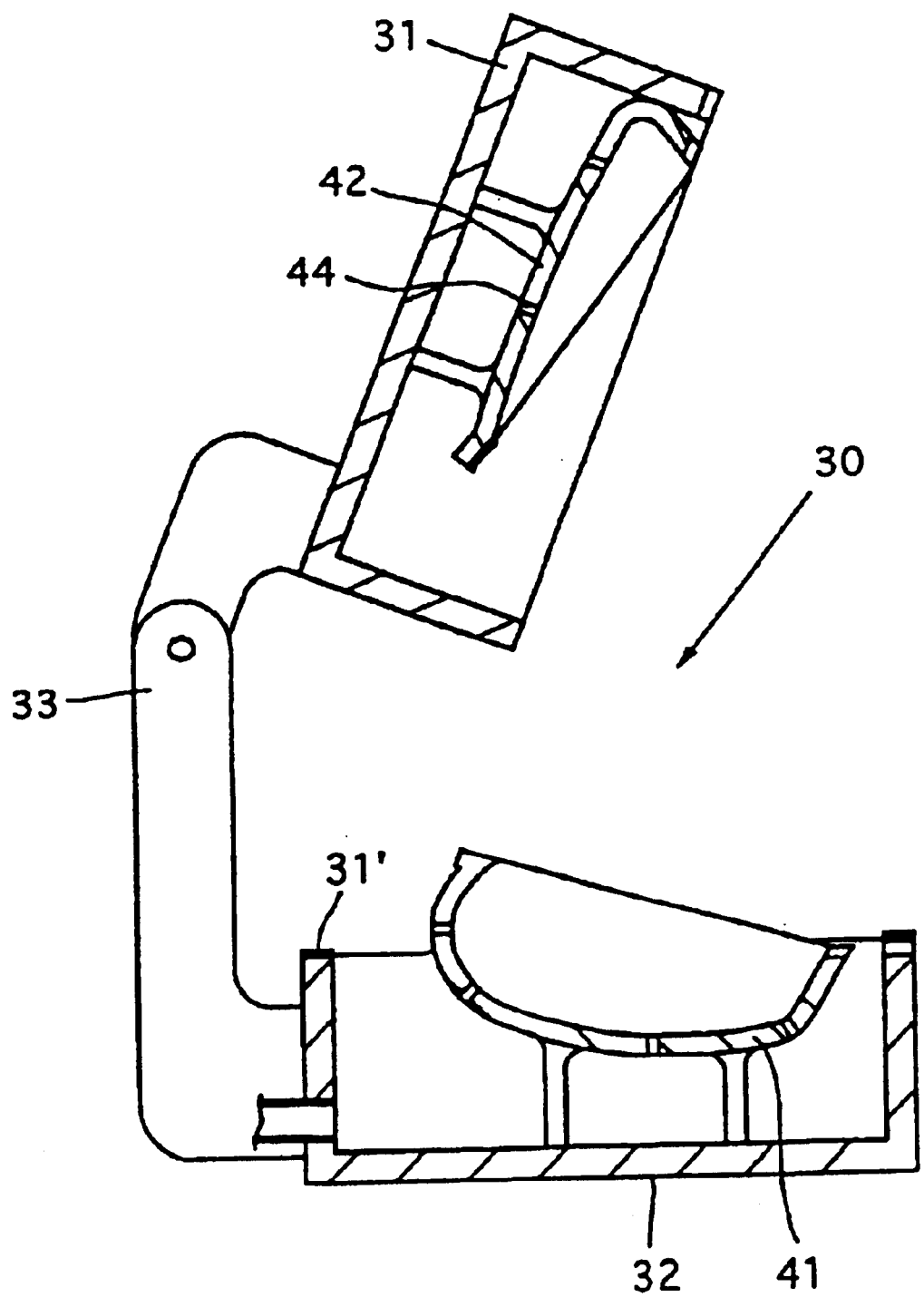
FIG. 7 is a partial sectional view of the suction-type packing container shown in FIG. 6 and shows that an upper part of the suction-type packing container is opened.

FIG. 7(a) is a front view of a surface material of a headrest H used for an automobile, and FIG. 7(b) is its bottom view. The surface material 70 used is formed of a fiber material and is thus air-permeable. A soft slab urethane foam is laminated on its inner surface. A bottom of the surface material 70 has two circular small holes 72, 72 and a slit 73 connected between those holes 72, 72. The holes 72 are provided for inserting a stay in the inside of the surface material 70, and the slit 73 is provided as an opening of the surface material 70. The slit 73 is usually closed as shown in FIG. 7(c).

The stay 74 is inserted in the surface material 70, and this surface material is then positioned in the molding device 40 (the upper mold 42 has been opened as shown in FIG. 6). A funnel 75 is positioned such that the funnel 75 connects between the entry port 34 and the inlet port 43 to smoothly deliver the filler material.

Figure 8:
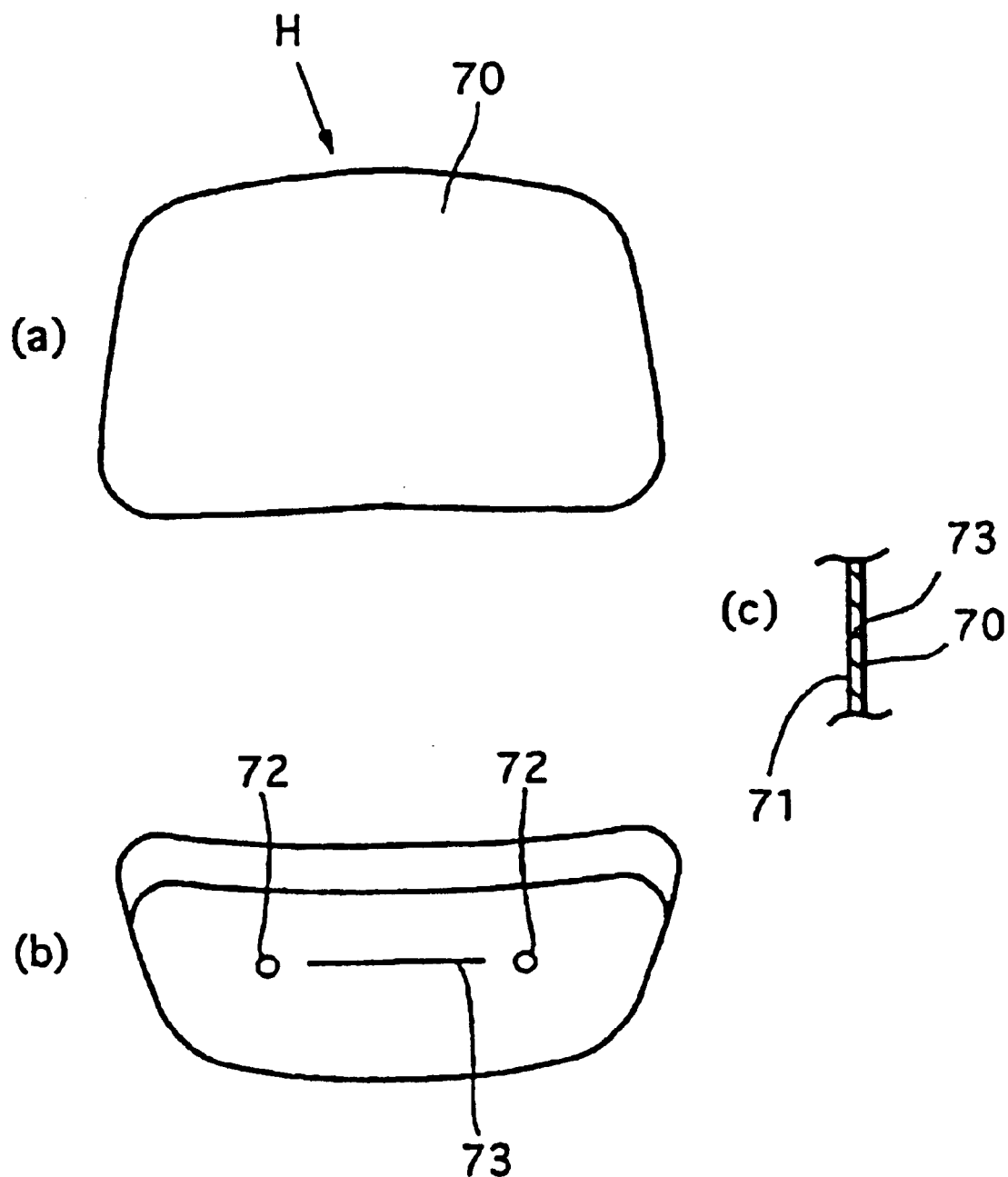
FIG. 8(a) is a front view of a surface material of a headrest used for an automobile.
FIG. 8(b) is a bottom view of the surface material and FIG. 8(c) is a partial sectional view of the surface material for showing a slit for supplying a filler material.
Figure 9:
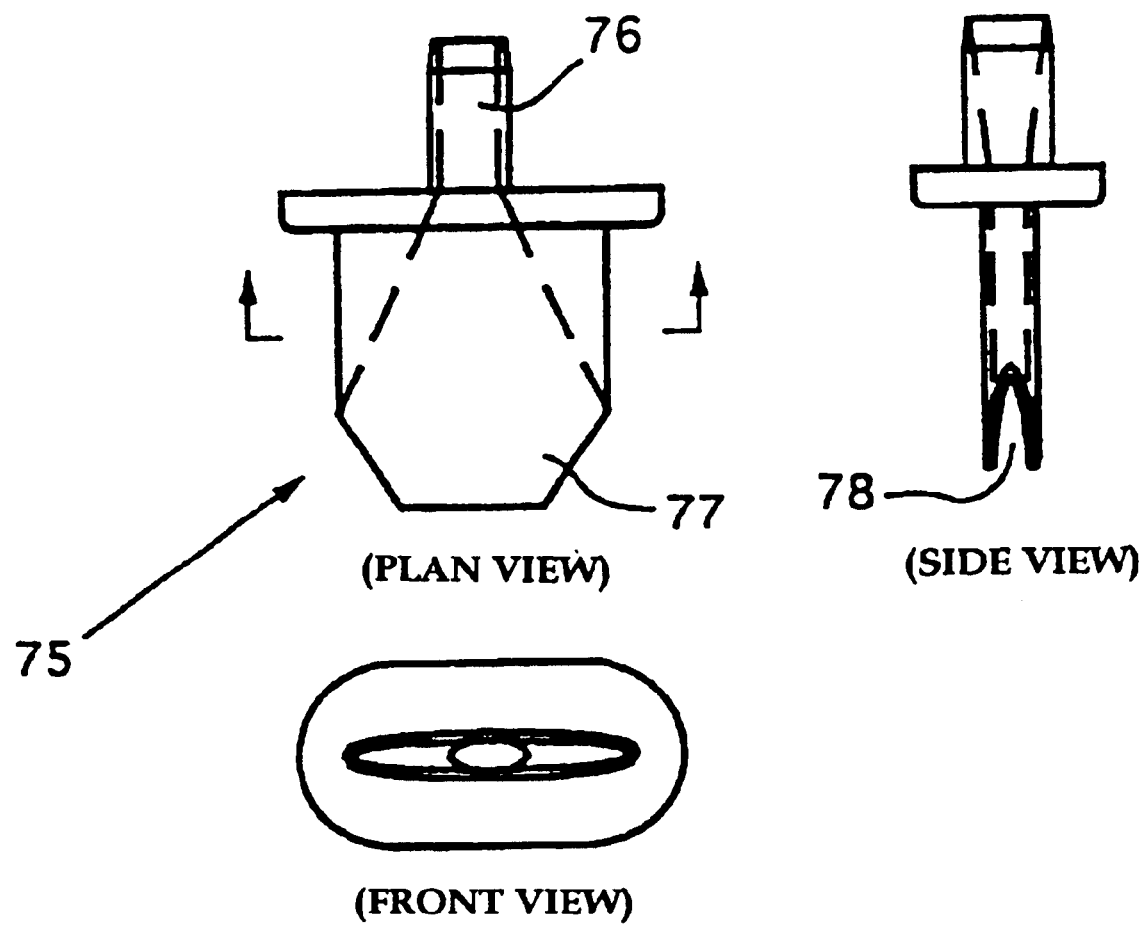
FIG. 9 shows a plan view, a front view and a side view of a funnel used for connecting between an entry port of a suction-type packing container and an opening of a surface material through an inlet of a molding device.

The funnel 75 is shown in detail in FIG. 8. The funnel 75 has a cylindrical plug 76 that is inserted in an end of the flexible pipe 51 and a nozzle 77 that is inserted in the surface material 70 through the entry port 34 and the slit 73 (opening) of the surface material 70. The nozzle 77 has an elliptical internal channel diverted from an end of the plug 76 and this diverted angle is more than 45 degrees, so that the filler material delivered via the connector 50 can be evenly packed in the surface material 70.

Figure 1:
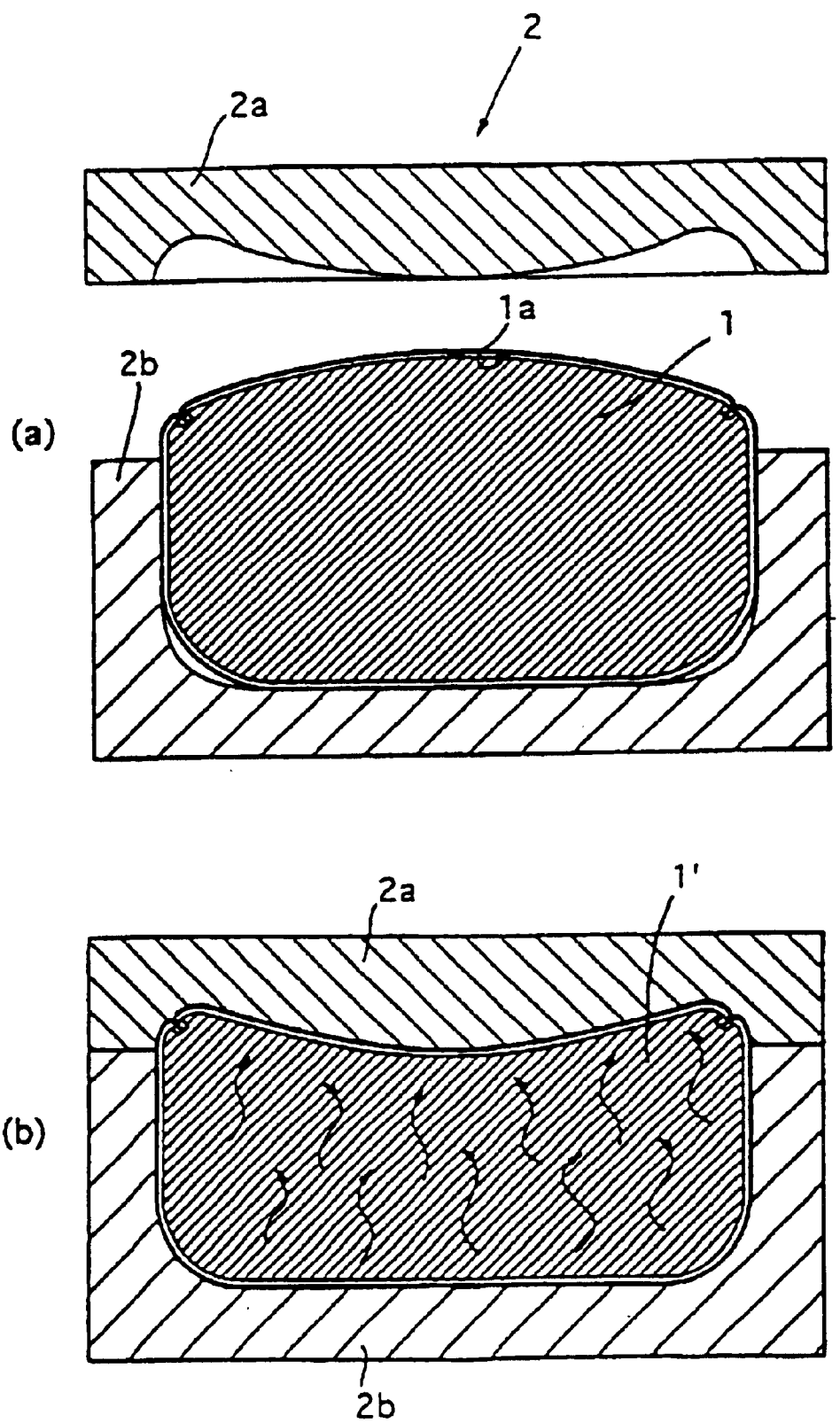
FIG. 1(a) shows that an article packed a filler material in a bag-shaped hollow surface material is positioned in a molding device.
FIG. 1(b) shows that steam passes through the article clamped in the molding device.
Figure 2:
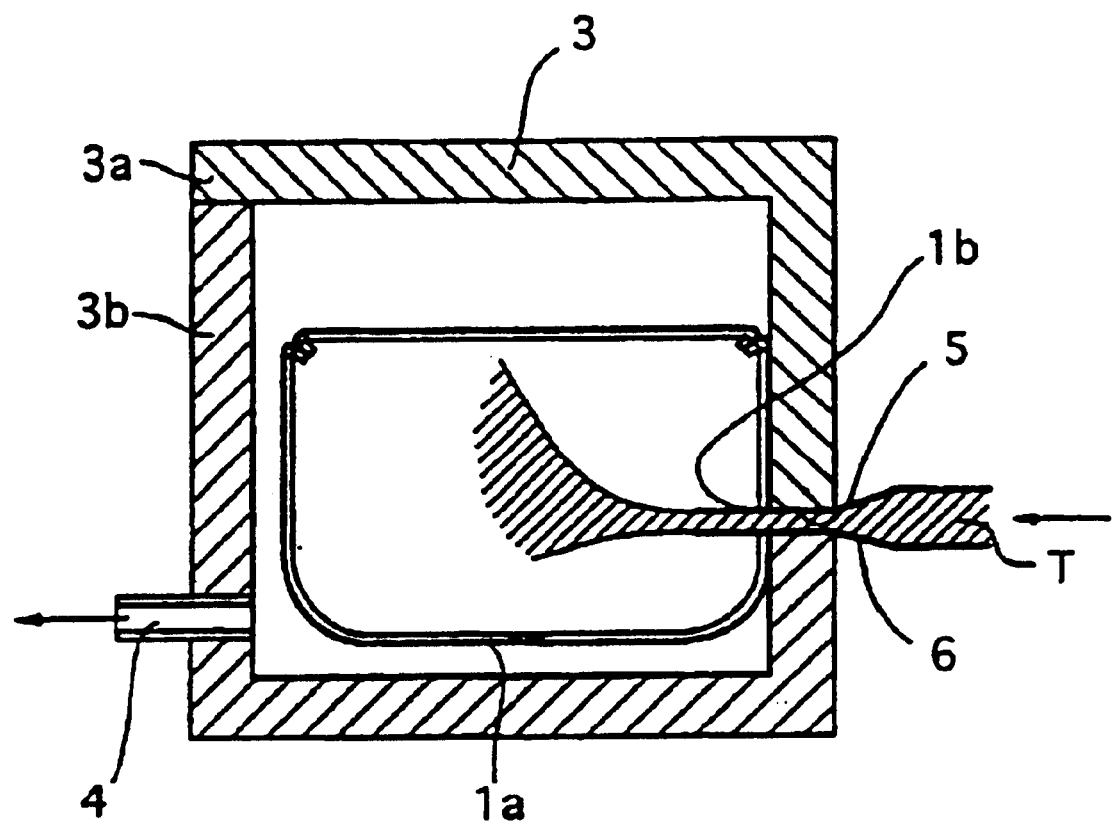
FIG. 2 shows that a filler material is delivered into a surface material positioned in a suction-type packing container using airflow.
Figure 10:
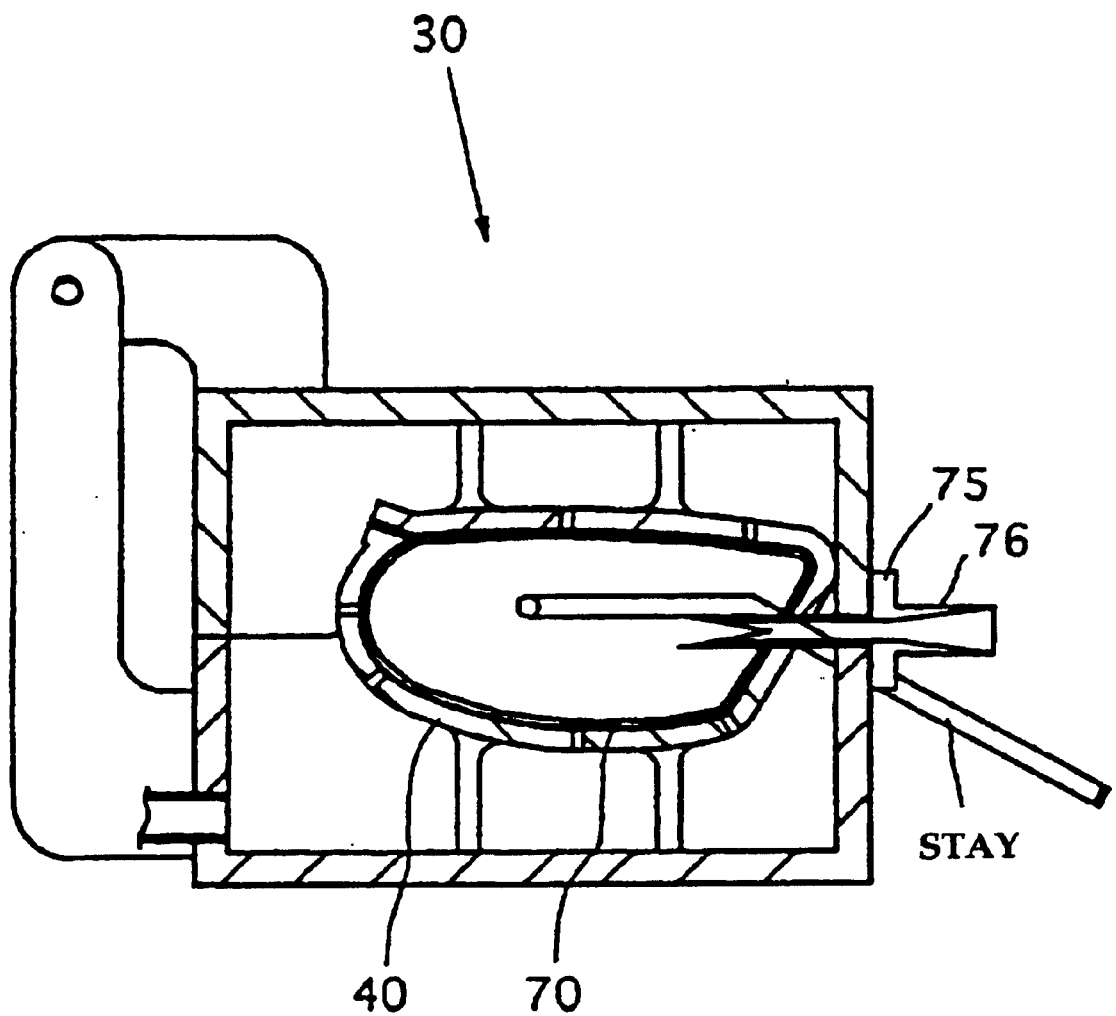
FIG. 10 shows that a surface material with a stay is positioned in a suction-type packing container and an upper part of the suction-type packing container is closed.

Then, as shown in FIG. 10, the upper part 31 of the suction-type packing container 30 is closed, and simultaneously, the upper mold 42 of the molding device 40 is closed. Then, as shown in FIG. 1, the outlet port 15 of the stirring container 11 is connected with the plug 76 of the funnel 75 via the connector 50. A predetermined amount of the filler material T has been brought in the stirring container 11.

Usually, a material used as the filler material is a mixture of chips of a scrapped surface material and chips of scrapped mold urethane foam. Those chips are produced as waste in manufacturing steps. The mixing rate (by weight) of those chips is 1:1. This filler material is brought in the stirring container 11 and is then stirred by use of the stirring vane 17 rotated by driving the electric motor 21. At the same time of starting this stirring or during this stirring, a water reactive urethane binder is supplied through the nozzle 16, as shown in FIG. 5, and is stirred with the filler material. The mixing rate of the filler material to the water reactive urethane binder is 1:0.2. The filler material (about 270 g per one headrest) is brought in the stirring container.

Then, the suction pump is driven, and as described above, air is drawn into the stirring container through the air vent holes 14. In this example, the size of each air vent hole is φ4 and twelve holes are provided in the stirring container.

Air drawn into the stirring container flows from the stirring container through the outlet port 15 and then flows to the inside of the surface material 70 via the connector 50 and the funnel 75. Then, the air flown to the inside of the surface material 70 passes through the surface material and flows to the suction port 35 through the suction holes 44 of the molding device 40.

When such airflow is formed, air drawn through the air vent holes 14 makes air just above the filler material T on the bottom wall 16 turbulent such that a top portion of the filler material T is blown up by the turbulent airflow, and as a result, the filler material blown up is scattered and is mixed with the air. Thus, the scattered filler material is delivered to the connector 50 together with the air (i.e. a mass of the filler material is not delivered to the connector 50), and thereby, the filler material is stably supplied in the surface material.

As described above, when the pumping source is driven, airflow is formed from the air vent holes of the stirring container to the suction port of the suction-type packing container. Simultaneously, the filler material and air is mixed, and the airflow with the filler material passes through the connecting means 50 from the outlet port 15 and then passes through the entry port 34 via the funnel 75. Then, while the filler material is delivered and left in the inside of the surface material, the air passes through the surface material 70 and flows to the suction port 35.

In the stirring container 11, while the filler material is discharged, the amount of the filler material stirred therein is decreased, so that the distance between the top part of the filler material stirred therein and the outlet port thereof is increased. However, as the amount of the filler material stirred in the stirring container is decreased, the kinetic energy of this filler material stirred by rotation of the stirring vane is increased, so that this filler material can fly higher. As a result, the predetermined amount of the filler material can be delivered to the bag-shaped hollow surface material and thereby, an article formed by packing the filler material in the surface material can be completed.

In this example, an amount of the filler material to be charged in the stirring container is an amount necessary for only one surface material. Alternatively, an amount necessary for a plurality of surface materials may be charged in the stirring container. If the amount necessary for a plurality of surface materials is charged therein, the operation of the pumping source and the stirring vane is stopped when a predetermined amount of the filler material necessary for one surface material has been delivered through the outlet port to the inside of the surface material. Then, the surface material in the suction-type packing container is replaced with another surface material. Thus, an article formed by packing the filler material in the surface material can be continuously formed.

Figure 11:
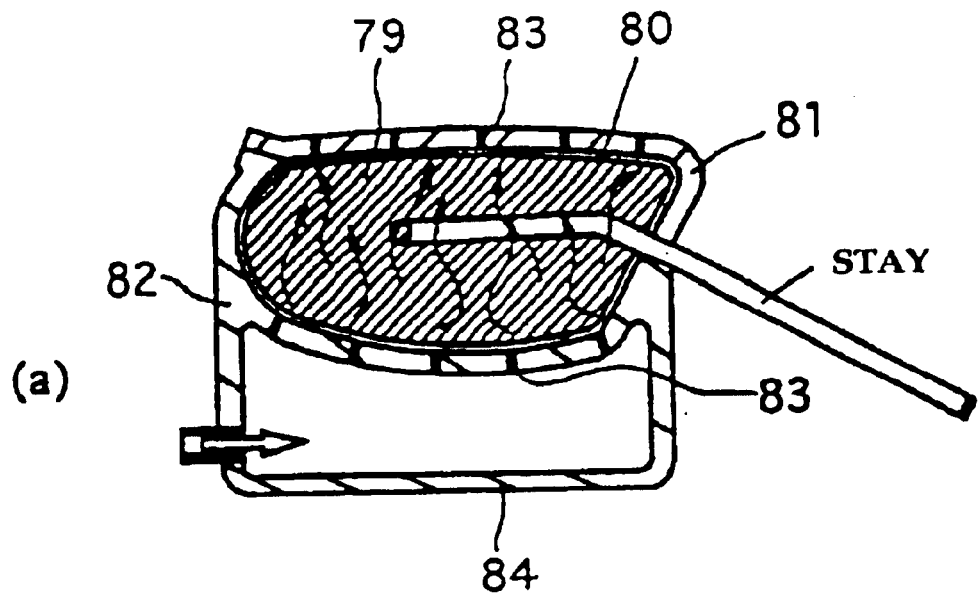
FIG. 11(a) shows that an article packed a filler material in a bag-shaped hollow surface material.
FIG. 11(b) shows a sectional view of a product packed the surface material with the filler material manufactured in accordance with the present invention.
Figure 11:
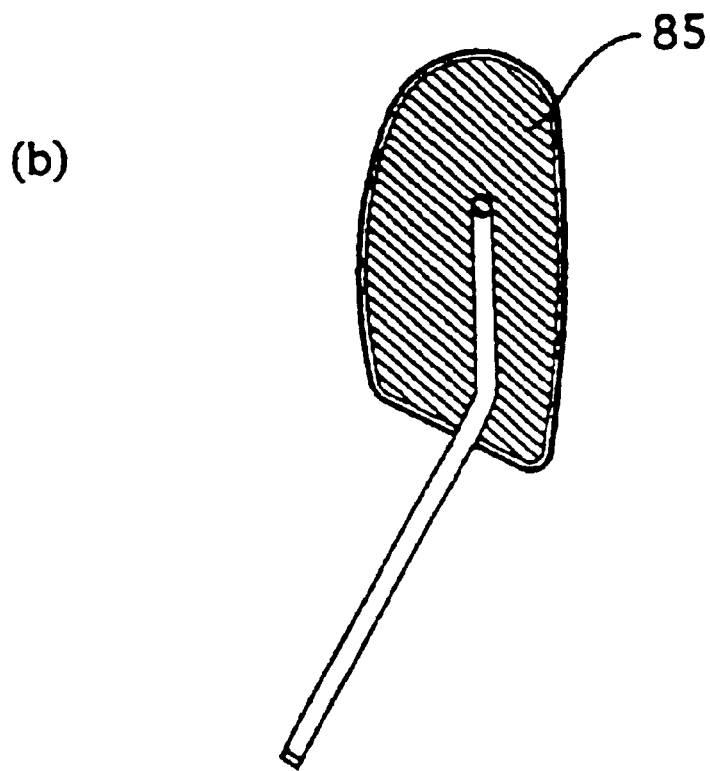

In general, the article 79 slightly expands more than its predetermined shape, even though the surface material is formed in a predetermined shape. This article 79 placed in a molding device 80, as shown in FIG. 11. The molding device 80 has an upper mold 81 and a lower mold 82, and a cavity having a predetermined shape is formed by those upper and lower molds 81, 82 The molding device 80 has holes 83, and steam passes through those holes 83. A steam chamber 84 is provided under the lower mold 82, and steam is entered into the steam chamber 84 and is then entered into the space between the upper and the lower molds 81, 82 through the holes 83 provided in the lower mold 82. As shown in FIG. 11(*a*), the steam entered into the space of the molding device 80 passes through the article 79 and is then evacuated through the holes 83 of the upper mold 81.

This steam contacts to the binder, and then, the binder cures so that the filler material adheres each other and adheres to an inner surface of the surface material.

The article packed the filler material in the surface material is ejected from the molding device, and then, it is set in a dryer at 120 centigrade degrees for one hour to remove residual water, and thereby, a complete article 85 is produced (FIG. 11(*b*)).

In accordance with the present invention, it is possible to stably pack a scattered granular or fragmental filler material in a bag-shaped hollow surface material. Thus, in an article produced in accordance with the present invention, the density of the filler material in the bag-shaped hollow surface material is even and its shape is formed in a desirable shape. If the filler material is mixed with a binder, the filler material can adhere each other and adhere to an inner surface of the surface material.

In accordance with the present invention, the following effects are conducted.

(1) A granular or fragmental filler material is scattered, and this scattered filler material can be evenly and stably packed in a bag-shaped hollow surface material. Thus, the density of the filler material inside the surface material is even, and an article having a desired shape can be formed. If a binder is mixed with the filler material, the filler material can be uniformly adhered each other and adheres an inner surface of the surface material.

(2) The filler material is stably delivered and packed in the surface material, and thus, the packing work becomes efficiency and its quality becomes even.

(3) In manufacturing steps of a seat of an automobile, waste such as chips of scrapped urethane foam and fragments of scrapped surface material is produced. In accordance with the present invention, not only such a waste but also fine powder and feather can be used as the filler material, and the filler material can be packed in the bag-shaped hollow surface material. In particular, in the art, such chips of urethane foam and fragments of surface material were wasted. However, in accordance with the present invention, such waste can be recycled.

(4) In the art, a mixture of a filler material and a binder was prepared for a plurality of surface materials and was weighed for only one surface material. This weighed mixture was delivered in only one surface material. Thus, the weighing machine was contaminated, and it took costs and time for removing this contamination. In addition, an additional machine was necessary for preparing the mixture, so that the scale of whole system was increased. Meanwhile, if a water reactive binder was used, the mixture of the filler material and the binder reacted with moisture contained in air, so that the viscosity of the binder is increased so that the efficiency of working was decreased. However, in accordance with the present invention, a filler material and a binder used for only one surface material are delivered to the surface material, and simultaneously, the filler material and the binder are stirred and mixed. Thus, the weighing machine is not contaminated and a space necessary for installation is saved. In addition, the efficiency of working does not decrease by increasing the viscosity of the binder.

What is claimed is:

1. A filler material packing system for packing a granular or fragmental filler material in a bag-shaped hollow surface material, at least a part of said surface material being air-permeable, comprising:

a suction-type packing container having an inner space, said surface material being positioned in said inner space, said suction-type packing container having a suction port and an entry port that are connected to said inner space; and a filler material delivering means for delivering said filler material to the inside of said surface material positioned in said inner space of said suction-type packing container, said filler material delivering means including:

a cylindrical stirring container having a lid, a sidewall and a bottom wall, said stirring container having a stirring vane positioned on said bottom wall, air vent holes and an outlet port being provided in an upper part of said sidewall;

connecting means for connecting between said outlet port of said stirring container and said entry port of said suction-type packing container and then connecting between the inside of said surface material positioned in said inner space of said suction-type packing container and said entry port thereof; and a pumping source connected to said inner space of said suction-type packing container through a suction port of said suction-type packing container, wherein if said pumping source is driven, the inside of said suction-type packing container is evacuated and decompressed so that air flows in the inside of said surface material positioned in said inner space of said suction-type packing container through said air vent holes of said stirring container, said outlet port thereof and said filler material delivering means, and the air flows in said inner space of said suction-type packing container through said surface material and then flows to said pumping source through said suction port.

2. The filler material packing system of claim 1 wherein said stirring container further
includes nozzle means for supplying a binder to the inside of said stirring container.

3. The filler material packing system of claim 2 wherein said nozzle means is provided in the upper part of said side wall or on said lid of said stirring container.

4. The filler material packing system of claim 1 wherein said suction-type packing container includes:

an upper part;

a lower part, those parts being pivotally connected to each other, and a molding device placed in said inner space of said suction-type packing container, said molding device having an upper mold and a lower mold, a cavity that can position said surface material being formed by those molds, those molds having suction holes that connect between the inside and the outside of said cavity, said molding device having an inlet coaxial with said entry port of said suction-type packing container, wherein said upper mold of said molding device is fixed to said upper part of said suction-type packing container and said lower mold of said molding device is fixed to said lower part of said suction-type packing container, and thereby, when said upper part of said suction-type packing container is opened with respect to its lower part, said upper mold of said molding device is simultaneously opened with respect to said lower mold of said molding device.

5. The filler material packing system of claim 1 wherein said connecting means includes:

a funnel inserted from said entry port of said suction-type packing container to said inner space thereof; and a pipe, one end of said pipe being connected to said outlet port of said stirring container and another end of said pipe being connected to said entry port of said suction-type packing container, wherein said surface material has an opening that connects to the inside thereof, and a tip part of said funnel is inserted in the inside of said surface material positioned in said inner space of said suction-type packing container.

6. A method for packing a filler material in a surface material of a filler material packing system, comprising steps of:

positioning said surface material in an inner space of a suction-type packing container;

bringing a necessary amount of said filler material in a stirring container;

rotating a stirring vane to stir said filler material; and decompressing said inner space of said suction-type packing container, while an outlet port of said stirring container is connected to an entry port of said suction-type packing container through connecting means, wherein, by said step of decompressing said inner space of said suction-type packing container, air flows from air-vent holes of the stirring container to said outlet port at a lower pressure of the upper part of said stirring container, and said filler material when stirred flows up and flows together with airflow formed toward said outlet port at the lower pressure of said stirring container, and then, said filler material is delivered to the inside of said surface material positioned in said inner space of said suction-type packing container through said connecting means, and said filler material delivered together with the airflow to the inside of said surface material is packed in the in side of said surface material, and air passes through said surface material and flows to a pumping source though a suction port of said suction-type packing container.

7. The method of claim 6 wherein said step of rotating said stirring vane to stir said filler material includes the step of supplying a binder in said stirring container.

* * * * *